(12) United States Patent
Hackett et al.

(10) Patent No.: US 10,157,687 B2
(45) Date of Patent: Dec. 18, 2018

(54) IRON-BASED COMPOSITION FOR FUEL ELEMENT

(71) Applicant: TerraPower, LLC, Bellevue, WA (US)

(72) Inventors: Micah J. Hackett, Seattle, WA (US); Ronald L. Klueh, Bellevue, WA (US)

(73) Assignee: TerraPower, LLC, Bellevue, WA (US)

( * ) Notice: Subject to any disclaimer, the term of this patent is extended or adjusted under 35 U.S.C. 154(b) by 0 days.

(21) Appl. No.: 15/428,947

(22) Filed: Feb. 9, 2017

(65) Prior Publication Data

US 2017/0148531 A1 May 25, 2017

Related U.S. Application Data

(63) Continuation-in-part of application No. 15/076,475, filed on Mar. 21, 2016, which is a continuation of (Continued)

(51) Int. Cl.
| | |
|---|---|
| *G21C 3/07* | (2006.01) |
| *C21D 6/02* | (2006.01) |
| *C22C 38/02* | (2006.01) |
| *C22C 38/04* | (2006.01) |
| *C22C 38/18* | (2006.01) |

(Continued)

(52) U.S. Cl.
CPC ............... *G21C 3/07* (2013.01); *C21D 6/002* (2013.01); *C21D 6/004* (2013.01); *C21D 6/005* (2013.01); *C21D 6/008* (2013.01); *C21D 6/02* (2013.01); *C21D 9/0068* (2013.01); *C22C 38/001* (2013.01); *C22C 38/002* (2013.01); *C22C 38/02* (2013.01); *C22C 38/04* (2013.01); *C22C 38/18* (2013.01); *C22C 38/42* (2013.01); *C22C 38/44* (2013.01); *C22C 38/46* (2013.01); *C22C 38/48* (2013.01); *G21C 21/10* (2013.01); *C21D 2211/001* (2013.01); *C21D 2211/004* (2013.01); *C21D 2211/008* (2013.01); *C21D 2251/02* (2013.01); *G21C 3/08* (2013.01)

(58) Field of Classification Search
CPC .......... G21C 3/07; C21D 6/002; C21D 6/004; C21D 6/005; C21D 6/008; C21D 6/02; C21D 2211/001; C21D 2211/004; C21D 2211/008; C21D 2251/02; C22C 38/001; C22C 38/002; C22C 38/02; C22C 38/04; C22C 38/18; C22C 38/42; C22C 38/44; C22C 38/46; C22C 38/48
USPC .................................. 148/547; 420/34, 67, 69
See application file for complete search history.

(56) References Cited

U.S. PATENT DOCUMENTS

| | | |
|---|---|---|
| 2,108,043 A | 2/1938 | Crist |
| 3,235,415 A | 2/1966 | Palty |

(Continued)

FOREIGN PATENT DOCUMENTS

| | | |
|---|---|---|
| CN | 87105993 A | 7/1988 |
| JP | S5281013 A | 7/1977 |

(Continued)

OTHER PUBLICATIONS

English translation of RU 2412255, Feb. 2011; 14 pages.*

(Continued)

*Primary Examiner* — Helene Klemanski

(57) ABSTRACT

Disclosed embodiments include fuel assemblies, fuel element, cladding material, methods of making a fuel element, and methods of using same.

15 Claims, 15 Drawing Sheets

Related U.S. Application Data application No. 13/794,589, filed on Mar. 11, 2013, now Pat. No. 9,303,295.

(60) Provisional application No. 61/747,054, filed on Dec. 28, 2012.

(51) Int. Cl.

| | |
|---|---|
| *C22C 38/42* | (2006.01) |
| *C22C 38/44* | (2006.01) |
| *C22C 38/46* | (2006.01) |
| *C22C 38/48* | (2006.01) |
| *C22C 38/00* | (2006.01) |
| *C21D 6/00* | (2006.01) |
| *G21C 21/10* | (2006.01) |
| *C21D 9/00* | (2006.01) |
| *G21C 3/08* | (2006.01) |

(56) References Cited

U.S. PATENT DOCUMENTS

| | | | |
|---|---|---|---|
| 3,254,991 A | | 6/1966 | Shimmin, Jr. |
| 3,969,186 A | | 7/1976 | Thompson et al. |
| 4,022,662 A | | 5/1977 | Gordon et al. |
| 4,075,058 A | | 2/1978 | Noyes |
| 4,129,461 A | | 12/1978 | Rashid |
| 4,147,591 A | | 4/1979 | Miki |
| 4,812,176 A | * | 3/1989 | Tanaka .................. C21D 6/002 148/597 |
| 4,963,200 A | * | 10/1990 | Okuda ................ C22C 32/0026 148/325 |
| 5,041,166 A | | 8/1991 | Matsuoka et al. |
| 5,247,550 A | | 9/1993 | Perkins et al. |
| 5,292,384 A | | 3/1994 | Klueh et al. |
| 5,383,228 A | | 1/1995 | Armijo et al. |
| 5,512,237 A | | 4/1996 | Stigenberg |
| 6,332,934 B2 | | 12/2001 | Tanida et al. |
| 6,344,098 B1 | | 2/2002 | Manning |
| 6,531,007 B1 | | 3/2003 | Nilsson et al. |
| 7,074,286 B2 | | 7/2006 | Klueh et al. |
| 7,235,212 B2 | | 6/2007 | Kuehmann et al. |
| 7,520,942 B2 | | 4/2009 | Klueh et al. |
| 8,153,056 B2 | | 4/2012 | Montagnon et al. |
| 8,246,767 B1 | | 8/2012 | Jablonski et al. |
| 9,008,259 B2 | | 4/2015 | Walters |
| 9,045,806 B2 | | 6/2015 | Montagnon |
| 9,133,532 B2 | | 9/2015 | Park et al. |
| 9,303,295 B2 | * | 4/2016 | Hackett .................... C21D 6/02 |
| 2006/0021682 A1 | | 2/2006 | Saha et al. |
| 2012/0106693 A1 | | 5/2012 | Kim |
| 2012/0114496 A1 | | 5/2012 | Oikawa et al. |
| 2012/0315181 A1 | | 12/2012 | Barbosa et al. |
| 2014/0185734 A1 | | 7/2014 | Petroski |
| 2016/0276045 A1 | * | 9/2016 | Hackett .................... C21D 6/02 |
| 2017/0148531 A1 | * | 5/2017 | Hackett .................... G21C 3/07 |
| 2017/0292179 A1 | * | 10/2017 | Hackett ................ C22C 38/001 |

FOREIGN PATENT DOCUMENTS

| | | |
|---|---|---|
| JP | S6283450 A | 4/1987 |
| JP | 1989139717 A | 6/1989 |
| JP | H01139717 A | 6/1989 |
| JP | H01287252 A | 11/1989 |
| JP | H0543933 A | 2/1993 |
| JP | 1999039717 A | 2/1999 |
| JP | 2003149366 A | 5/2003 |
| JP | 2004-076034 | 3/2004 |
| JP | 2010138465 A | 6/2010 |
| RU | 2061939 C1 | 6/1996 |
| RU | 2137562 C1 | 9/1999 |
| RU | 2412255 C1 | 2/2011 |
| SU | 1286636 A1 | 1/1987 |
| WO | 93/07303 | 4/1993 |
| WO | 2012036482 | 3/2012 |
| WO | 2012036483 | 3/2012 |
| WO | 2014105795 | 7/2014 |
| WO | 2017180647 A1 | 10/2017 |

OTHER PUBLICATIONS

English translation of RU 2061939, Jun. 1996; 7 pages.*
English translation of RU 2137562, Sep. 1999; 6 pages.*
English translation of SU 1286636, Jan. 1987; 6 pages.*
PCT International Search Report; International App. No. PCT/US2013/077422; May 15, 2014; pp. 1-2.
Vollmer J et al. Assessment of Annular Fuel for a Commercial-Scale Traveling Wave Reactor, Oct. 2011.
Spiekermann P: "Alloys—a special problem of patent law" Nonpublished English Translation of Document, Dec. 31, 1993, pp. 1-20.
PCT International Preliminary Report on Patentability and Written Opinion; International App. No. PCT/US2013/077422; dated Jun. 30, 2015.
Emigh R.A. Effect of Multiple Austenitizing Treatments on HT-9 Steels M.S. Thesis Lawrence Berkeley Laboratory, University of California Materials and Molecular Research Division, Dec. 1985.
Smidt et al. Swelling Behavior of Commercial Ferritic Alloy, EM-12 and HT-9, as Assessed by Heavy Ion Bombardment, ASTM International 1976, pp. 227-241.
Baek et al. "Investigation of temperature dependence of fracture toughness in high-dose HT9 steel using small-specimen reuse technique" Journal of Nuclear Materials vol. 4-44 pp. 206-213, 2014.
Byun et al. "Small Specimen Reuse Technique to Evaluate Fracture Toughness of High Dose HT9 Steel" ASTM Special Publications, 2015, pp. 22.
Klueh et al. "Tensile Behavior of Irradiated 12Cr-1MoVW Stee", Journal of Nuclear Materials, vol. 137 p. 44, 1985.
Sandvik "Impact Strength of Sandvik HT9", Sandvik, Stockholm, 1980.
Ukai et al. "R&D of Oxide Dispersion Strengthened Ferritic Martensitic Steels for FBR", Journal of Nuclear Materials, Elsevier BV, NL.
Chin "An Analysis of the Creep Properties of a 12Cr-1Mo-W-V Steel" in Topical Conference on Ferritic Alloys for Use in Nuclear Energies Technologies, 1984.
Brensing et al. "Steel Tube and Pipe Manufacturing Process", Dec. 31, 1994, pp. 1-63.
Redmon J.W. A Study of the Effects of Austenitizing and Tempering Heat Treatments on the Alloy HT-9, Technical Report from Auburn University Engineering Department, Auburn, Alabama, Dec. 1985.
Klueh et al. "Ferritic/martensitic steels for next-generation reactors" Journal of Nuclear Materials vol. 371, pp. 37-52, 2007.
Wilcox et al. "Austenitizing and Microstructure of a HT-9 Steel" Elsevier Science Publishing Co Inc., 1984.
Kim T.K. et al. Fuel Cycle Analysis of Once-Through Nuclear Systems Argonne National Laboratory, Aug. 10, 2010.
Lee B.O. Performance Evaluation of Metallic Fuel for SFR, International Conference on Fast Reactors and Related Fuel Cycles (FR09), Korea Atomic Energy Institute; Kyoto Japan Dec. 9, 2009, pp. 1-29.
Sandvik "HT-9 Datasheet 1 750ENG", Sandvik, 1981.
Toloczko et al. "Irradiation creep and swelling of the U.S. fusion heats of HT9 and 9Cr-1Mo to 208dpa at ~400° C.", in Sixth International Conference on Fusion Materials,1993.
Hackett, et al, "HT9 Development for the Traveling Wave Reactor, Invited", Transactions of the American Nuclear Society, vol. 106, Chicago, IL, Jun. 24-28, 2012.
Chen, Yiren, "Irradiation Effects of HT-9 Martensitic Steel", Nuclear Engineering and Technology, vol. 45, No. 3, Jun. 2013.
Getto, E., et al, "Void Swelling and Microstructure Evolution at Very High Damage Level in Self-Ion Irradiated Ferritic-Martensitic Steels", Journal of Nuclear Materials 480, Aug. 2016.

\* cited by examiner

501

Generating power using a fuel assembly, a fuel element of which includes an iron-based composition described herein

Generating at least one of electrical power and thermal power

FIG. 5b

TEM sample image, with voids in damage range of 300 – 700 nm from sample surface counted for swelling measurement, while other voids are ignored.

IRON-BASED COMPOSITION FOR FUEL ELEMENT

CROSS-REFERENCE TO RELATED APPLICATIONS

This application is a continuation-in-part of U.S. application Ser. No. 15/076,475, filed Mar. 21, 2016. U.S. application Ser. No. 15/076,475 is a continuation of U.S. application Ser. No. 13/794,589, filed Mar. 11, 2013, now U.S. Pat. No. 9,303,295, which application claims the benefit of U.S. Provisional Application No. 61/747,054, filed Dec. 28, 2012, which applications are incorporated herein by reference in their entirety.

BACKGROUND

The present patent application relates to a fuel element including a cladding material and methods related to same.

SUMMARY

Disclosed embodiments include fuel elements, fuel assemblies, cladding materials, and methods of making and using same.

The foregoing is a summary and thus may contain simplifications, generalizations, inclusions, and/or omissions of detail; consequently, those skilled in the art will appreciate that the summary is illustrative only and is NOT intended to be in any way limiting. In addition to any illustrative aspects, embodiments, and features described above, further aspects, embodiments, and features will become apparent by reference to the drawings and the following detailed description. Other aspects, features, and advantages of the devices and/or processes and/or other subject matter described herein will become apparent in the teachings set forth herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 5a and 5b, respectively, provide a flow chart of a process of using a composition and illustrative details of the process in one exemplary embodiment.

DETAILED DESCRIPTION

Introduction

Figure 1A:
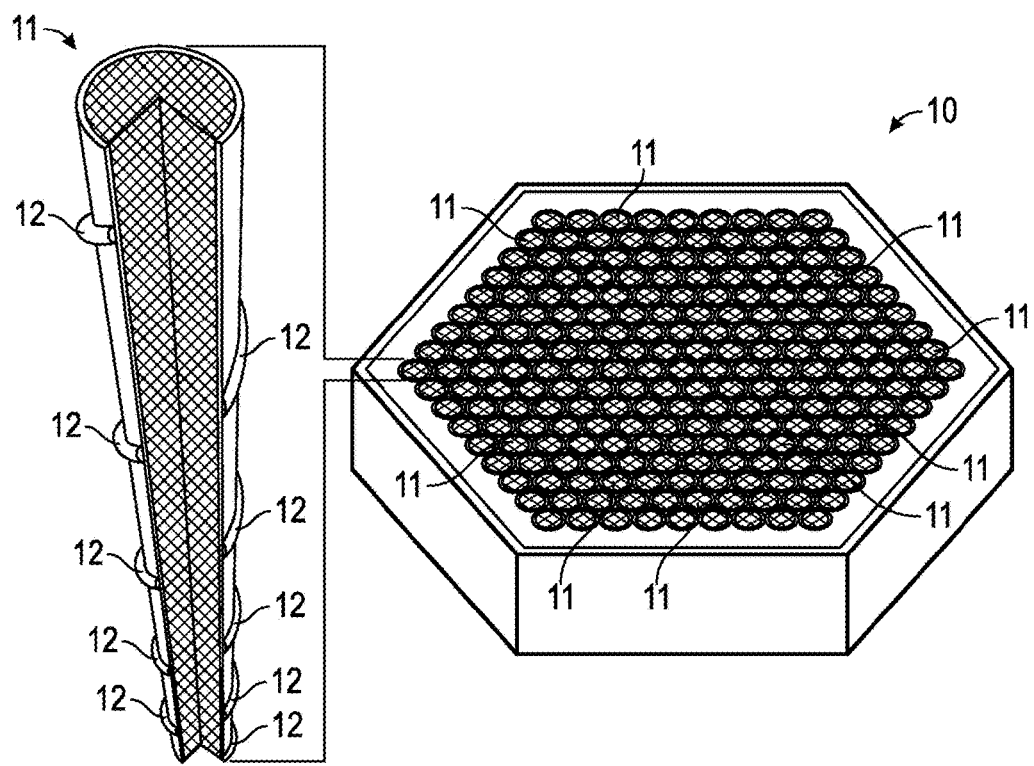
FIGS. 1a-1b provide partial-cutaway perspective views in schematic form of an illustrative (a) nuclear fuel assembly and (b) fuel element in one exemplary embodiment.

In the following detailed description, reference is made to the accompanying drawings, which form a part hereof. In the drawings, the use of similar or the same symbols in different drawings typically indicates similar or identical items, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Overview

By way of overview, provided in one embodiment is a method of making a composition, the method comprising: heat treating a material including an iron-based composition at a first temperature under a first condition in which at least some of the iron-based composition is transformed into an austenite phase; cooling the material to a second temperature at a cooling rate under a second condition in which at least some of the iron-based composition is transformed into a martensite phase; and heat treating the material at a third temperature under a third condition in which carbides are precipitated.

Provided in another embodiment is a method of making a composition, the method comprising: subjecting a material to at least one of cold drawing, cold rolling, and pilgering;

heat treating the material including an iron-based composition at a first temperature under a first condition in which at least some of the iron-based composition is transformed into an austenite phase; cooling the material to a second temperature at a cooling rate under a second condition in which at least some of the iron-based composition is transformed into a martensite phase; and heat treating the material at a third temperature under a third condition, in which carbides are precipitated.

Provided in another embodiment is a composition comprising: (Fe)a(Cr)b(M)c; wherein a, b, and c are each a number greater than zero representing a weight percentage; M is at least one transition metal element; b is between 11 and 12; c is between about 0.25 and about 0.9; and balanced by a; and the composition further includes at least N at between about 0.01 wt % and about 0.04 wt %.

Provided in another embodiment is a composition, comprising: (Fe)a(Cr)b(Mo, Ni, Mn, W, V)c; wherein a, b, and c are each a number greater than zero representing a weight percentage; b is between 11 and 12; c is between about 0.25 and about 0.9; and balanced by a; at least substantially all of the composition has a martensite phase; and the composition includes N at between about 0.01 wt % and about 0.04 wt %.

Provided in another embodiment is a method of using a fuel assembly, comprising: generating power using a fuel assembly, a fuel element of which includes a composition, which is represented by a chemical formula: (Fe)a(Cr)b(M)c; wherein a, b, and c are each a number greater than zero representing a weight percentage; M is at least one transition metal element; b is between 11 and 12; c is between about 0.25 and about 0.9; and balanced by a; and the composition further includes at least N at between about 0.01 wt % and about 0.04 wt %.

Provided in another embodiment is a fuel element comprising a tubular composition made by a method comprising: heat treating a material including an iron-based composition at a first temperature under a first condition in which at least some of the iron-based composition is transformed into an austenite phase; cooling the material to a second temperature at a cooling rate under a second condition in which at least some of the iron-based composition is transformed into a martensite phase; and heat treating the material at a third temperature under a third condition, in which carbides are precipitated. In one embodiment, in compositions where nitrogen is present, the precipitation of carbides may be accompanied by precipitation of nitrides and carbonitrides.

Fuel Assembly

Figure 1B:
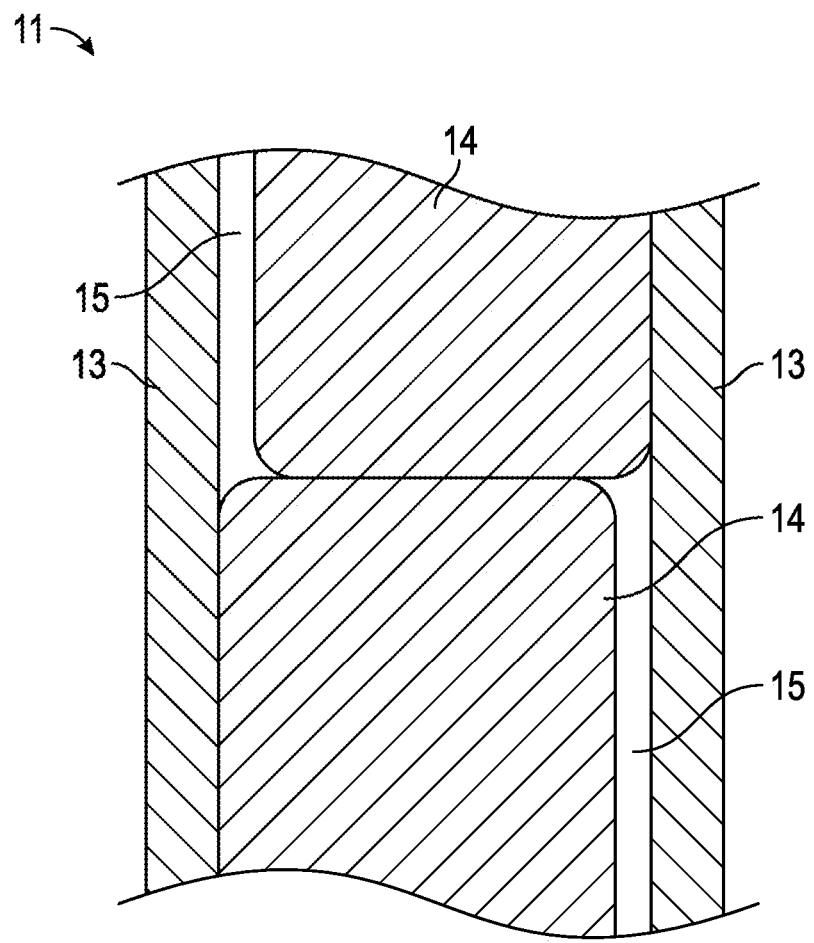

FIG. 1a provides a partial illustration of a nuclear fuel assembly 10 in accordance with one embodiment. The fuel assembly may be a fissile nuclear fuel assembly or a fertile nuclear fuel assembly. The assembly may include fuel elements (or "fuel rods" or "fuel pins") 11. FIG. 1b provides a partial illustration of a fuel element 11 in accordance with one embodiment. As shown in this embodiment, the fuel element 11 may include a cladding material 13, a fuel 14, and, in some instances, at least one gap 15.

Fuel may be sealed within a cavity by the exterior cladding material 13. In some instances, the multiple fuel materials may be stacked axially as shown in FIG. 1b, but this need not be the case. For example, a fuel element may contain only one fuel material. In one embodiment, gap(s) 15 may be present between the fuel material and the cladding material, though gap(s) need not be present. In one embodiment, the gap is filled with a pressurized atmosphere, such as a pressured helium atmosphere.

A fuel may contain any fissionable material. A fissionable material may contain a metal and/or metal alloy. In one embodiment, the fuel may be a metal fuel. It can be appreciated that metal fuel may offer relatively high heavy metal loadings and excellent neutron economy, which is desirable for breed-and-burn process of a nuclear fission reactor. Depending on the application, fuel may include at least one element chosen from U, Th, Am, Np, and Pu. The term "element" as represented by a chemical symbol herein may refer to one that is found in the Periodic Table—this is not to be confused with the "element" of a "fuel element". In one embodiment, the fuel may include at least about 90 wt % U—e.g., at least 95 wt %, 98 wt %, 99 wt %, 99.5 wt %, 99.9 wt %, 99.99 wt %, or higher of U. The fuel may further include a refractory material, which may include at least one element chosen from Nb, Mo, Ta, W, Re, Zr, V, Ti, Cr, Ru, Rh, Os, Ir, and Hf. In one embodiment, the fuel may include additional burnable poisons, such as boron, gadolinium, or indium.

The metal fuel may be alloyed with about 3 wt % to about 10 wt % zirconium to stabilize dimensionally the alloy during irradiation and to inhibit low-temperature eutectic and corrosion damage of the cladding. A sodium thermal bond fills the gap that exists between the alloy fuel and the inner wall of the cladding tube to allow for fuel swelling and to provide efficient heat transfer, which may keep the fuel temperatures low. In one embodiment, individual fuel elements 11 may have a thin wire 12 from about 0.8 mm diameter to about 1.6 mm diameter helically wrapped around the circumference of the clad tubing to provide coolant space and mechanical separation of individual fuel elements 56 within the housing of the fuel assemblies 18 and 20 (that also serve as the coolant duct). In one embodiment, the cladding 13, and/or wire wrap 12 may be fabricated from ferritic-martensitic steel because of its irradiation performance as indicated by a body of empirical data.

Fuel Element

A "fuel element", such as element 11 shown in FIGS. 1a-1b, in a fuel assembly of a power generating reactor may generally take the form of a cylindrical rod. The fuel element may be a part of a power generating reactor, which is a part of a nuclear power plant. Depending on the application, the fuel element may have any suitable dimensions with respect to its length and diameter. The fuel element may include a cladding layer 13 and a fuel 14 disposed interior to the cladding layer 13. In the case of a nuclear reactor, the fuel may contain (or be) a nuclear fuel. In one embodiment, the nuclear fuel may be an annular nuclear fuel. The fuel element may additionally include a liner disposed between the nuclear fuel 14 and the cladding layer 13. The liner may contain multiple layers.

The fuel may have any geometry. In one embodiment, the fuel has an annular geometry. In such an embodiment, a fuel in an annular form may allow a desirable level of fuel density to be achieved after a certain level of burn-up. Also, such an annular configuration may maintain compressive forces between the fuel and the cladding to promote thermal transport. The fuel may be tailored to have various properties, depending on the application. For example, the fuel may have any level of density. In one embodiment, it is desirable to have a high density of fuel, such as one as close to theoretical density uranium (in the case of a fuel containing uranium) as possible. In another embodiment, having a high porosity (low density) may prevent formation of additional internal voids during irradiation, decreasing fuel pressure on structural material, such as cladding, during operation of the nuclear fuel.

The cladding material for the cladding layer 13 may include any suitable material, depending on the application.

In one embodiment, the cladding layer 13 may include at least one material chosen from a metal, a metal alloy, and a ceramic. In one embodiment, the cladding layer 13 may contain a refractory material, such as a refractory metal including at least one element chosen from Nb, Mo, Ta, W, Re, Zr, V, Ti, Cr, Ru, Rh, Os, Ir, Nd, and Hf. In another embodiment, the cladding material may be chosen from a ceramic material, such as silicon carbide or aluminum oxide (alumina).

A metal alloy in cladding layer 13 may be, in one exemplary embodiment, steel. The steel may be chosen from an austenitic steel, a ferritic-martensitic steel, an oxide-dispersed steel, T91 steel, T92 steel, HT9 steel, 316 steel, and 304 steel. The steel may have any type of microstructure. For example, the steel may include at least one of a martensite phase, a ferrite phase, and an austenite phase. In one embodiment, substantially all of the steel has at least one phase chosen from a martensite phase, a ferrite phase, and an austenite phase. Depending on the application, the microstructure may be tailored to have a particular phase (or phases). The cladding layer 13 may include an iron-based composition as described below.

At least some of the components of the fuel elements may be bonded. The bonding may be physical (e.g., mechanical) or chemical. In one embodiment, the nuclear fuel and the cladding are mechanically bonded. In one embodiment, the first layer and the second layer are mechanically bonded.

Iron-Based Composition

Provided in one embodiment herein is a composition including a metal. The metal may include at least one of a metal, metal alloy, and intermetallic composition. In one embodiment, the metal includes iron. In one embodiment, the composition includes an iron-based composition. The term "X-based" composition in one embodiment may refer to a composition including a significant amount an element X (e.g., metal element). The amount may be, for example, at least 30%—e.g., at least 40%, at least 50%, at least 60%, at least 70%, at least 80%, at least 90%, at least 95%, at least 99%, or more. The percentage herein may refer to weight percent or a volume (or atomic) percent, depending on the context. In one embodiment, the iron-based composition may include steel.

The compositions described herein may be employed as a component of a nuclear fuel element, such as the cladding material thereof. However, the metal-containing composition need not be limited to cladding material and may be employed wherever such a composition is employed. For example, provided in one embodiment is a composition that is represented by the chemical formula (Fe)a(Cr)b(M)c, wherein a, b, and c are each a number greater than zero representing a weight percentage; depending on the context, these numbers may alternatively represent a volume percentage. In one embodiment, b is a number between 11 and 12, c is between about 0.25 and about 0.9; balanced by a. In one embodiment, the composition includes at least nitrogen ("N") at between about 0.005 wt % and about 0.05 wt %—e.g., about 0.01 wt % and about 0.04 wt %, between about 0.01 wt % and about 0.03 wt %, between about 0.02 wt % and about 0.03 wt %, etc. The element M may represent at least one transition metal element. The element M in this iron-based composition may be any transition metal element found in the Periodic Table—e.g., the elements in Groups 3-12 of the Periodic Table. In one embodiment, M represents at least one of Mo, Ni, Mn, W, and V.

In another embodiment, the composition may include (or be) an iron-based composition including a steel composition. The composition may be represented by the chemical formula: (Fe)a(Cr)b(Mo, Ni, Mn, W, V)c, wherein a, b, and c are each a number greater than zero representing a weight percentage; depending on the context, the numbers may alternatively represent a volume percentage. In one embodiment, the number b is between 11 and 12; c is between about 0.25 and about 0.9; balanced by a. In one embodiment, the composition includes N at between about 0.01 wt % and about 0.04 wt %.

The composition may contain at least one additional element. The additional element may be a non-metal element. In one embodiment, the non-metal element may be at least one element chosen from Si, S, C, and P. The additional element may be a metal element, including Cu, Cr, Mo, Mn, V, W, Ni, etc. In one embodiment, the composition further includes Cr at between about 10 wt % and about 12.5 wt %; C at between about 0.17 wt % and about 0.22 wt %; Mo at between about 0.80 wt % and about 1.2 wt %; Si less than or equal to about 0.5 wt %; Mn less than or equal to about 1.0 wt %; V at between about 0.25 wt % and about 0.35 wt %; W at between about 0.40 wt % and about 0.60 wt %; P less than or equal to about 0.03 wt %; and S less than or equal to about 0.3 wt %. In another embodiment, the composition further includes Ni at between about 0.3 wt % and 0.7 wt %. In another embodiment, the composition further includes Cr at about 11.5 wt %; C at about 0.20 wt %; Mo at about 0.90 wt %; Ni at about 0.55 wt %; Mn at about 0.65 wt %; V at about 0.30 wt %; W at about 0.50 wt %; Si at about 0.20 wt % and N at about 0.02 wt %. Other elements may also be present in any suitable amount. In some cases, certain incidental impurities may be present.

The composition may include an iron-based composition that includes a steel composition including a tailored microstructure. For example, the compositions provided herein may have a small amount of a delta-ferrite phase. In one embodiment, the composition is at least substantially free of delta-ferrite. In another embodiment, the composition is completely free of delta-ferrite. Instead of a ferrite phase, the composition may include a martensite phase (e.g., tempered martensite). In one embodiment, substantially all of the composition has a martensite phase. In another embodiment, completely all of the composition has a martensite phase. As described below, one technique of tailoring the microstructure (e.g., to mitigate formation of a ferrite phase) may be to control the content of nitrogen within the range provided herein. Mitigation herein may refer to reduction and/or prevention but need not refer to total elimination.

The microstructure, including the phases, may be described in terms of a chromium equivalent. In one embodiment, chromium equivalent ("$Cr_{eq}$") is the sum of ferrite forming elements plotted in constitution diagrams for the estimation of phases in stainless steel, weld metal, and calculated from various equations. In some instances, chromium equivalent may be used in conjunction with nickel equivalent, which is the sum of austenite forming elements. The equation may be any suitable equation, depending at least on the material chemistry. In one embodiment, the equation may be represented by the net chromium equivalent, net $Cr_{eq}$ which is the difference between chromium equivalent and nickel equivalent. Net $Cr_{eq}$ (wt %)=(% Cr)+6(% Si)+4(% Mo)+11(% V)+5(% Nb)+1.5(% W)+8(% Ti)+12(% Al)−4(% Ni)−2(% Co)−2(% Mn)−(% Cu)−40(% C)−30(% N). In one embodiment, the compositions described herein may have $Cr_{eq}$ of less than or equal to about 10—e.g., less than or equal to about 9, 8, 7, 6, 5, 4, 3, 2, or less. In one embodiment, the $Cr_{eq}$ may be kept under 9 to mitigate formation of ferrites. Based on the equation above, N-content may play an important role in the value of $Cr_{eq}$, and hence the ferrite formation (or lack thereof).

Due at least in part to the microstructure, the compositions described herein may have tailored material properties. For example, the compositions may have a high thermal stability. Thermal stability of a composition in one embodiment may refer to the resistance of a particular phase of the composition to decomposition (or dissociation) into another phase at an elevated temperature. In one embodiment, the compositions described herein are substantially thermally stable at a temperature of greater or equal to about 500° C.—e.g., greater or equal to about 550° C., about 600° C., or higher.

The compositions provided herein may include additional phase(s) or material(s). For example, in a case where the composition includes carbon, the carbon element may be present in the form of a carbide. In one embodiment, the composition may include carbides distributed substantially uniformly in the composition. The carbides may have any suitable sizes, depending on the application. In one embodiment, the carbides have a size of less than or equal to about 2 microns—e.g., less than or equal to about 1 micron, 0.5 microns, 0.2 microns, 0.1 microns, or smaller.

Methods of Making/Using the Iron-Based Composition

Figure 2A:
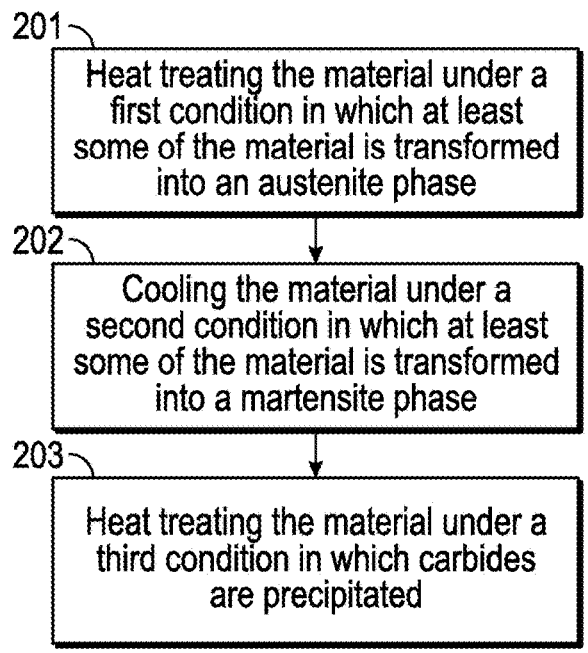
FIGS. 2a and 2b-2f, respectively, provide a flow chart of a process of making a composition and illustrative details of the process in one exemplary embodiment.

The iron-based composition and a fuel element including the composition described herein may be manufactured by a variety of techniques. The iron-based composition may be any of the compositions described herein. For example, the composition may include a steel. Provided in another embodiment is a fuel element having a tubular structure made by the methods described herein. For example, referring to FIG. 2a, provided in one embodiment is a method of making a composition; the method includes heat treating a material including an iron-based composition at a first temperature under a first condition in which at least some of the iron-based composition is transformed into an austenite phase (step 201); cooling the material to a second temperature at a cooling rate under a second condition in which at least some of the iron-based composition is transformed into a martensite phase (step 202); and heat treating the material at a third temperature under a third condition in which carbides are precipitated (step 203). In one embodiment, steps 201 and 202 together may be referred to as normalization, whereas step 203 may be referred to as tempering.

The first temperature may be any temperature suitable for the first condition. In one example, the first temperature may be above the austenitization temperature of the composition the temperature at which substantially all of the ferrite phase of the iron-based composition—transforms to an austenite phase. The austenite temperature varies with the material chemistry. In one embodiment, the first temperature is between about 900° C. and about 1200° C.—e.g., about 1000° C. and about 1150° C., about 1025° C. and about 1100° C., etc. The first temperature may be higher than 1200° C. or lower than 900° C., depending on the material. In an embodiment, the processing of the steel composition includes transforming at least some of the steel composition into an austenite phase by heating the steel composition to a temperature from 1100° C. to 1300° C. for 40-60 hours.

Figure 2B:
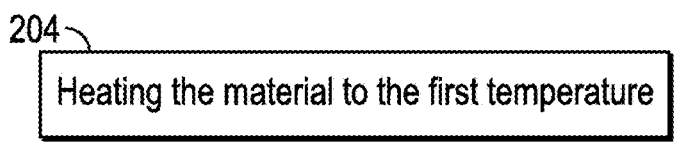

Referring to FIG. 2b, the process of heat treating at the first temperature may further comprise heating the material to the first temperature (step 204). Heat treating at the first temperature may be carried out for any suitable length of time, depending on the material involved. The time may be adjusted such that the length is sufficiently long to promote formation of a homogeneous austenite solid solution. In one embodiment, the heat treatment may be carried out for about at least 3 minutes—e.g., at least 4 minutes, 5 minutes, 15 minutes, 20 minutes, 30 minutes, 60 minutes, 90 minutes, 120 minutes, 150 minutes, 180 minutes, or more. A longer or shorter length of time is also possible. In one embodiment, heat treating at the first temperature may be carried out for between about 1 minute and about 200 minutes—e.g., about 2 minutes and about 150 minutes, about 3 minutes and about 120 minutes, about 5 minutes and about 60 minutes, etc. In one embodiment, during heat treating at the first temperature (e.g. at the end of the treatment), at least some of the iron-based composition is transformed into an austenite phase. In one embodiment, substantially all of the composition is transformed into an austenite phase. In another embodiment, completely all of the composition is transformed into an austenite phase. In one embodiment, the first condition mitigates formation of a delta-ferrite phase of the iron-based composition. In another embodiment, the first condition promotes transformation of substantially all of the iron-based composition into an austenite phase.

Figure 2C:
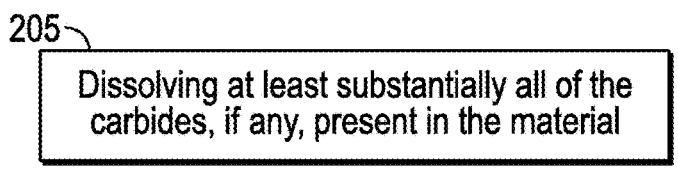

Referring to FIG. 2c, the process of heat treating at the first temperature (step 201) may further comprise dissolving at least substantially all of the carbides, if any, present in the iron-based composition of the material (step 205).

The second temperature in step 202 may be any temperature suitable for the second condition. In one embodiment, the second temperature is less than or equal to 60° C.—e.g., less than or equal to 50° C., 40° C., 30° C., 20° C., 10° C., or less. In one embodiment, the second temperature is about room temperature (e.g., 20° C.). Cooling may be carried out via any suitable techniques. In one embodiment, cooling includes cooling by at least one of air and liquid. In one embodiment, the second condition promotes transformation of substantially all of the iron-based composition into a martensite phase. For example, the cooling may be carried out at a sufficient rate such that during cooling (e.g. at the end of the treatment), at least some of the iron-based composition is transformed into a martensite phase. In one embodiment, the rate is high enough that substantially all of the composition is transformed into a martensite phase. In another embodiment, the rate is high enough that completely all of the composition is transformed into a martensite phase. In one embodiment, at the end of cooling the composition is substantially free of at least one phase chosen from a ferrite phase and an austenite phase. In one embodiment, at the end of cooling the composition is completely free of at least one phase chosen from a ferrite phase and an austenite phase.

The third temperature in step 203 may be any temperature suitable for the third condition. The third temperatures may be lower than the temperature above which austenite begins to form. In one embodiment, the third temperature may be lower than the first temperature. In one embodiment, the third temperature is at least 500° C.—e.g., at least 550° C., 600° C., 650° C., 700° C., 750° C., 800° C., 850° C., 900° C., or more. In one embodiment, the third temperature is between about 500° C. and about 900° C.—e.g., about 550° C. and about 850° C., about 600° C. and about 800° C., about 650° C. and about 780° C., about 700° C. and about 750° C., etc. A higher or lower temperature is also possible. The third temperature may be high enough to precipitate carbides and impart high temperature stability of carbides but low enough that carbide density is high and the carbide size is small with a homogeneous distribution of carbides for void swelling resistance.

Figure 2D:
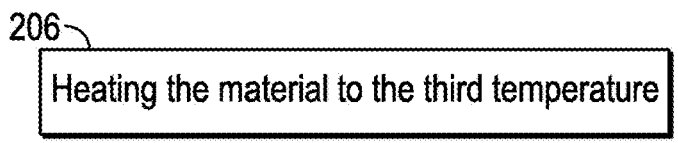

Referring to FIG. 2d, heat treating at the third temperature may include heating the material to the third temperature (step 206). Heat treating at the third temperature may be carried out for any suitable length of time, depending on the material involved. In one embodiment, heat treating at the third temperature may be carried out for between about 0.1 hours and about 5 hours—e.g., between about 0.2 hours to about 4 hours, about 0.5 hours to about 3 hours, about 1 hours and about 2 hours, etc. A longer or shorter length of time is also possible. In one embodiment, the third condition may mitigate the formation of a ferrite phase and/or an austenite phase of the iron-based composition. In one embodiment, the composition is substantially free of a ferrite phase and/or an austenite phase. The heat treatment may be carried out by any suitable techniques. In one embodiment, heat treating at the third temperature is carried out in a vertical furnace.

Figure 2E:
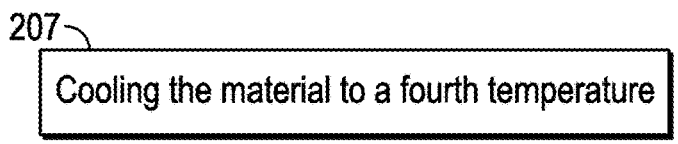
Figure 2F:
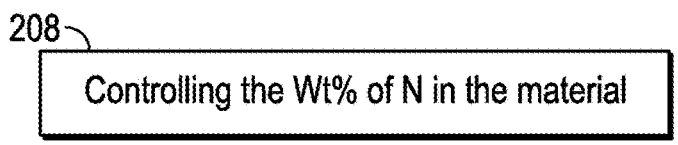

Additional process(es) may be involved. For example, referring to FIG. 2e, the method may further comprise cooling the composition from the third temperature to a fourth temperature (step 207). The fourth temperature may be lower than the third temperatures. For example, the fourth temperature may less than or equal to 60° C.—e.g., less than or equal to 50° C., 40° C., 30° C., 20° C., 10° C., or less. In one embodiment, the fourth temperature is about room temperature (e.g., 20° C.). Referring to FIG. 2f, the method may further comprise controlling the wt % of N in the iron-based composition of the material to mitigate growth of a carbide phase of the iron-based composition (step 208).

Figure 3A:
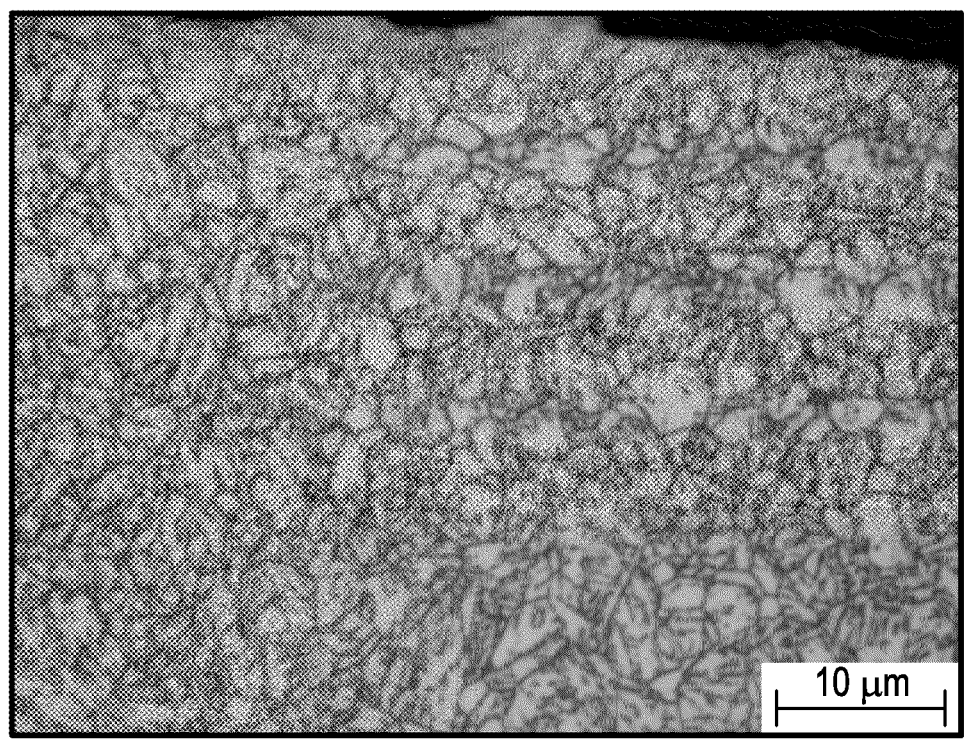
FIGS. 3a-3c provide optical micrographs showing the different microstructures of iron-based compositions that have undergone different processes in one exemplary embodiment.
Figure 3B:
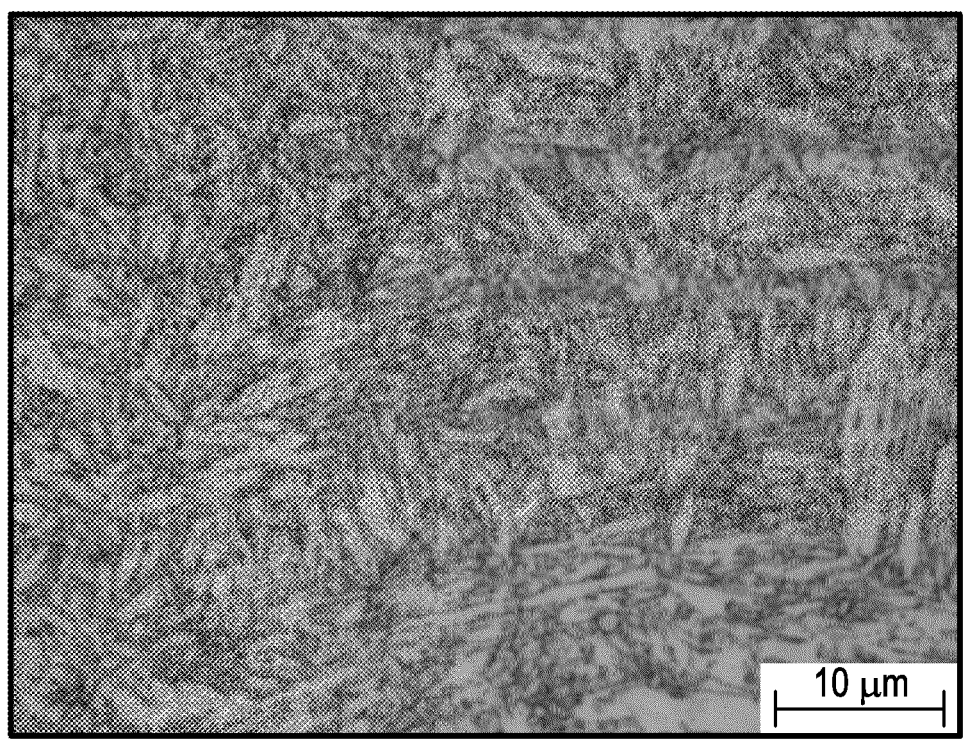
Figure 3C:
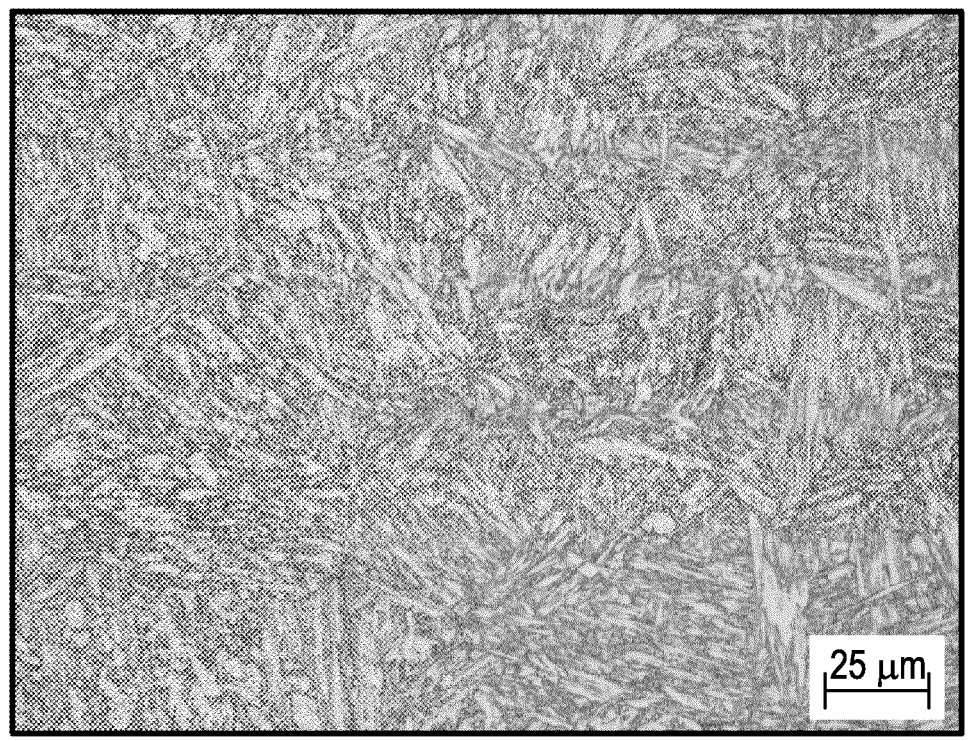

Referring to FIGS. 3a-3c, the differences in microstructure of the iron-based composition are illustrated in the figures. FIG. 3a shows a microstructure with blocky delta ferrite grains, loss of tempered martensite microstructure, and many grains devoid of complex carbide microstructure, in conventional steel. FIG. 3b shows an improved microstructure, with more homogenous carbide microstructure in the tempered martensite grains—note there are still some small delta ferrite grains in the microstructure. FIG. 3c shows a result of subjecting a steel sample to the processes described herein. The figure shows improved microstructure substantially free of delta ferrite with most grain regions having a high density of finely distributed carbides.

Figure 4A:
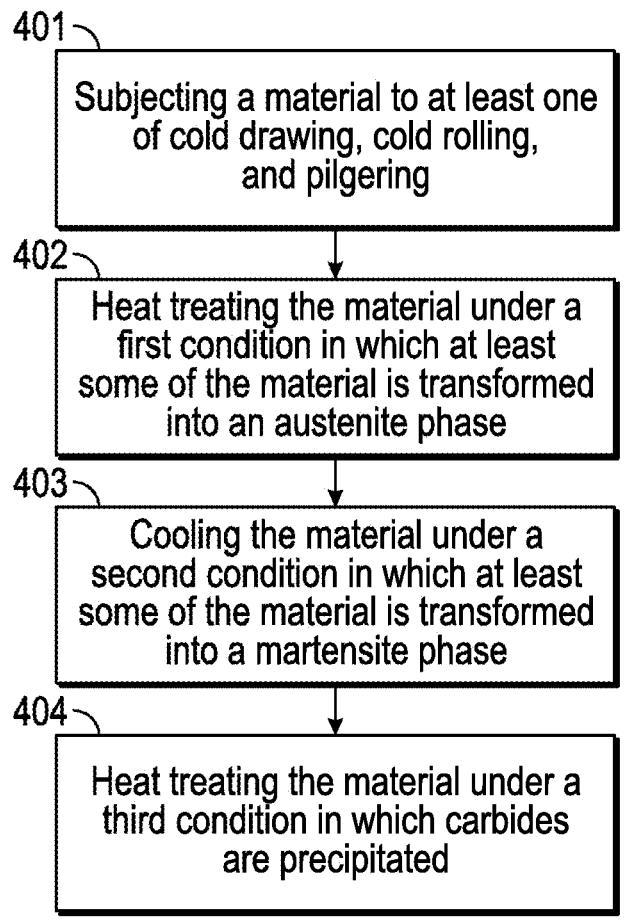
FIGS. 4a and 4b-4e, respectively, provide a flow chart of a process of making a composition and illustrative details of the process in another exemplary embodiment.

Another embodiment provides an alternative method of making of a composition. Referring to FIG. 4a, the method includes: subjecting a material to at least one of cold drawing, cold rolling, and pilgering (step 401); heat treating the material including an iron-based composition at a first temperature under a first condition in which at least some of the iron-based composition is transformed into an austenite phase (step 402); cooling the material to a second temperature at a cooling rate under a second condition in which at least some of the iron-based composition is transformed into a martensite phase (step 403); and heat treating the material at a third temperature under a third condition, in which carbides are precipitated (step 404).

In step 401, the material is cold worked; cold drawing, cold rolling, and pilgering are only some examples of processes that the material may be subjected to. One result of cold working is that the material dimension may be changed to a desired value. For example, the thickness of the material may be reduced as a result of cold working. In one embodiment, the reduction in thickness may be, for example, by at least 5%—e.g., at least 10%, 15%, 20%, 25%, or more. In one embodiment, the reduction is between about 5% and about 20%—e.g., between about 8% and about 16%, between about 10% and about 15%, etc. Higher or lower values are also possible.

Figure 4B:
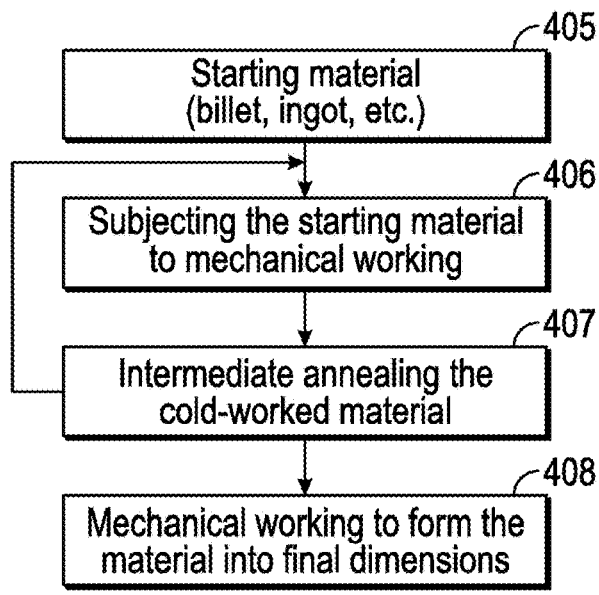

The dimension(s) of the material may be controlled via additional processes. In one embodiment, the ingot may undergo a thermo-mechanical processing to form the material with the final desired dimension(s). Referring to FIG. 4b, the starting material to be processed may be a billet, ingot, forging, etc., that has a cylindrical shape (step 405). The starting material is then mechanically worked (e.g., cold worked) by suitable tube-manufacturing process(es) (step 406). When the tube-manufacturing process involves cold work, the work piece may be annealed ("intermediate annealing") after the working process at a temperature below the temperature above which austenite begins to form—below a transformation temperature from ferrite phase to an austenite phase (step 407). In one embodiment, austenite needs to be avoided because it would transform on cooling to hard martensite, thus counteracting the softening process. Steps 406 and 407 are repeated until the final dimensions are achieved. In one embodiment, after the final cold working step (step 408) that provides the tube with its final dimensions, the tube is not annealed again. The tube then may undergo normalization and tempering, as described above.

Figure 4C:
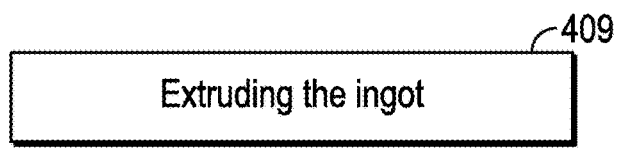
Figure 4D:
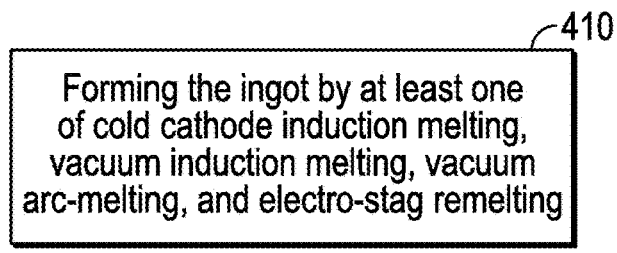
Figure 4E:
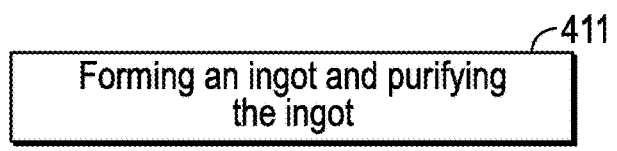

The method may include additional processes. Referring to FIG. 4c, the method may further comprise extruding an ingot including the composition (step 409). Referring to FIG. 4d, the method may further comprise forming an ingot including the iron-based composition before the subjecting step, wherein the forming includes at least one process chosen from cold cathode induction melting, vacuum induction melting, vacuum arc re-melting, and electro-slag remelting (step 410). Referring to FIG. 4e, the method may further comprise forming an ingot including the iron-based composition and purifying the ingot to remove impurities (e.g., P, S, etc.) before the subjecting step (step 411). The forming and the purifying processes may involve any suitable techniques. The aforedescribed temperatures may vary depending on the materials and/or applications thereof involved.

A fuel element (and fuel assemblies) including the composition (e.g., as the cladding) may be used in a variety of applications. Provided in one embodiment is a method of using a fuel assembly. Referring to FIG. 5a, the method includes generating power using a fuel assembly, a fuel element of which includes any of the iron-based compositions described herein (step 501). Referring to FIG. 5b, the generation of power may include generating at least one of electrical power and thermal power (step 502).

Power Generation

As described above, the fuel assemblies described herein may be a part of a power or energy generator, which may be a part of a power generating plant. The fuel assembly may be a nuclear fuel assembly. In one embodiment, the fuel assembly may include a fuel, a plurality of fuel elements, and a plurality of fuel ducts, such as those described above. The fuel ducts may include the plurality of fuel elements disposed therein.

The fuel assembly described herein may be adapted to produce a peak areal power density of at least about 50 MW/m$^2$—e.g., at least about 60 MW/m$^2$, about 70 MW/m$^2$, about 80 MW/m$^2$, about 90 MW/m$^2$, about 100 MW/m$^2$, or higher. In some embodiments, the fuel assembly may be subjected to radiation damage at a level of at least about 120 displacements per atom ("DPA")—e.g., at least about 150 DPA, about 160 DPA, about 180 DPA, about 200 DPA, or higher.

All of the above U.S. patents, U.S. patent application publications, U.S. patent applications, foreign patents, foreign patent applications and non-patent publications referred to in this specification and/or listed in any Application Data Sheet, are incorporated herein by reference in their entirety, to the extent not inconsistent herewith. In the event that one or more of the incorporated literature and similar materials differs from or contradicts this application, including but not limited to defined terms, term usage, described techniques, or the like, this application controls.

EXAMPLES

Embodiments of the composition described above were made and tested for void swelling performance. Three heats, identified as Heats FD, CH, and DH, of the composition were prepared to meet the specification listed above. Heats CH and DH are the same composition that differ only in a slight variation in the final heat treatment. For relative comparison between historic HT9 and the embodiments of the composition described herein, a historical HT9 sample of heat 84425 from the ACO-3 duct used in the Fast Flux Test Facility (FFTF) was tested for swelling using the same protocol.

The actual composition of the final plate product of each heat was determined by analysis and is shown in Table 1. The actual composition of the historical sample was also determined and is likewise presented in Table 1.

TABLE 1

| Element | Heat FD Max. | Heat FD Min. | Heat FD Actual | Heats CH and DH Actual | Historical HT9 ACO-3 Actual |
|---|---|---|---|---|---|
| Fe | Bal. | Bal. | Bal. | Bal. | Bal. |
| C | 0.19 | 0.17 | 0.176 | 0.20 | 0.20 |
| Si | 0.23 | 0.17 | 0.21 | 0.22 | 0.27 |
| Mn | 0.53 | 0.47 | 0.50 | 0.69 | 0.58 |
| P | 0.01 | — | <0.005 | 0.004 | 0.003 |
| S | 0.003 | — | 0.0017 | 0.001 | 0.004 |
| Cr | 12.2 | 11.8 | 12.12 | 11.56 | 11.87 |
| Mo | 1.05 | 0.95 | 1.01 | 0.88 | 1.02 |
| Ni | 0.55 | 0.45 | 0.52 | 0.56 | 0.53 |
| V | 0.33 | 0.27 | 0.30 | 0.315 | 0.30 |
| W | 0.65 | 0.55 | 0.60 | 0.49 | 0.37 |
| N | 0.013 | 0.007 | 0.011 | 0.023 | 0.0017 |
| Cu | 0.02 | — | <0.01 | — | 0.013 |
| Al | — | — | — | — | 0.002 |
| Nb | — | — | — | <0.004 | <0.010 |
| Co | — | — | — | — | 0.011 |

Heat FD Preparation

A 50 kg VIM ingot of Heat FD steel was heated at 1,200° C. for 48 hours to homogenize the cast structure and then was forged to approximately 70 t×100 w×450 L (mm). The temperature of furnace for homogenizing was controlled by PID temperature controller and by using calibrated thermocouple. The forged plate was soaked at 1,200° C. for 2 hours and hot-rolled from 70 t×100 w×450 L (mm) to approximately 24 t×110 w×1,050 L (mm).

A portion of the hot-rolled steel plate was annealed at 800° C. for 1 hour in order to make easy surface machining and approximately 0.3 mm per side was machined off the surface plate to remove any oxide film. The plate was then cold-rolled to a thickness of 5.4 mm by multiple steps. At the intermediate passes during cold rolling, the plate was annealed at 800° C. for 1 hour for softening cold-worked structure. Again, the furnace temperature for intermediate heat treatment is controlled by the PID temperature controller of furnace and by using calibrated thermocouple.

After cold rolling, the plate was annealed at 800° C. for 1 hour in order to make easy sawing and was cut to smaller pieces for final heat treatment.

After cutting, final heat treatment was performed for on one of the smaller pieces. This piece, designated Heat FD, was heat-treated (as part of a batch of pieces of other steels) at 1,000° C. for 30 minutes and then air-cooled to room temperature in order to obtain martensite structure. The temperature of furnace for normalization heat treatment was controlled by PID temperature controller and by using calibrated thermocouple. Furthermore, new thermocouples were attached by spot welding on the surface of one of the pieces in the heat treatment batch. The batch including the piece attached to thermocouples was put in the furnace at the normalization temperature, and final normalization heat treatment time started to count after thermocouples attached on piece reached the normalization temperature. After holding for prescribed time, the batch was taken out of the furnace.

The normalized piece of Heat FD was heat-treated at 750° C. for 0.5 hour in order to temper the martensite structure, and then was air-cooled to room temperature. The temperature of furnace for final temper heat treatment was controlled by PID temperature controller and by using calibrated thermocouple. Again, the Heat FD piece was part of a batch of other steel pieces that included a piece with attached thermocouples as described above. The batch was put in the furnace kept at the tempering temperature, and final tempering treatment time started to count after thermocouples attached on piece reached the tempering temperature or 750° C. After holding for 30 minutes, the tempered batch was taken out of the furnace.

The Vickers hardness of the tempered Heat FD piece was tested three times and determined to be 238, 246, and 241 for an average of 242.

Heat CH and DH Preparation

Figure 6A:
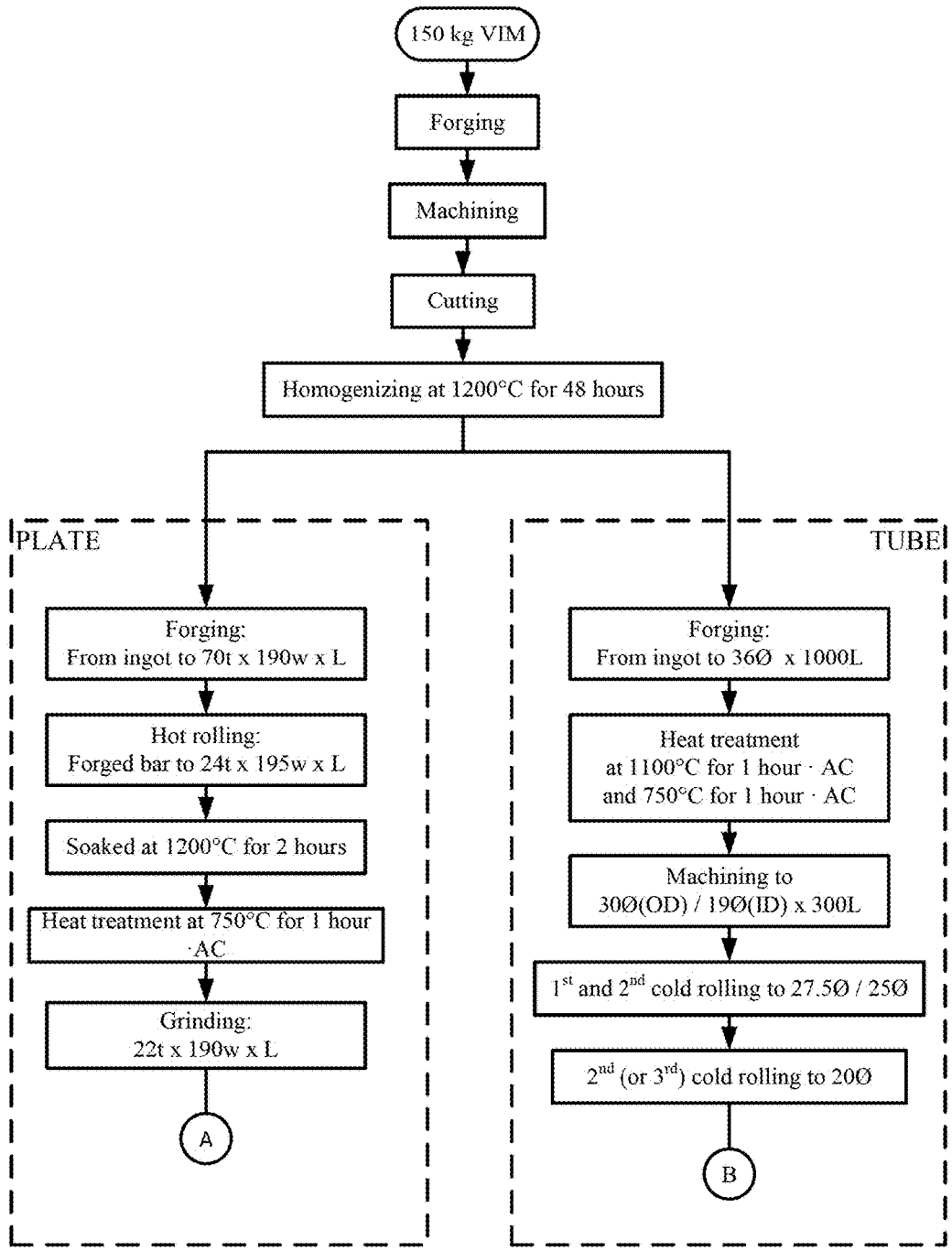
FIGS. 6a and 6b show a process outline of the major process steps used to fabricate plate and tube products of Heats CH and DH.
Figure 6B:
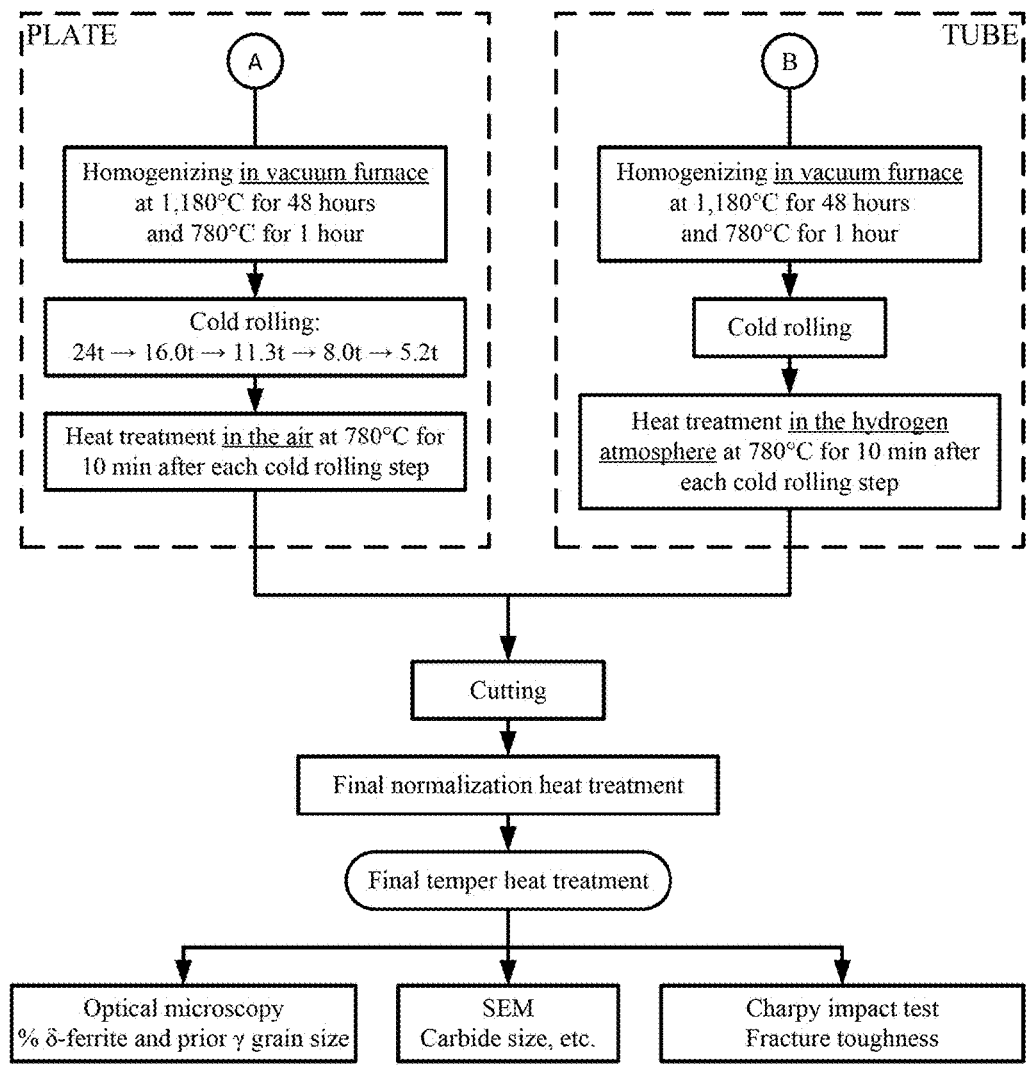

FIGS. 6a and 6b show a process outline of the major process steps used to fabricate plate and tube products of Heats CH and DH. The early processing steps (vacuum induction melting (VIM), vacuum arc re-melting (VAR) and homogenization were applied for both Heats.

One peculiarity of the fabrication process is the application of a second homogenization heat treatment at 1180° C. for 48 hours, either after hot rolling of the plate or after the $2^{nd}$ or $3^{rd}$ cold rolling step for the tube.

Swelling Testing

Heavy ion irradiation testing was conducted on plates of each of the three heats and the historic control sample to determine the swelling performance of the composition. Irradiations were conducted in an ion beam laboratory using a dual ion ($Fe^{++}$ and $He^{++}$) irradiation beam to simulate the production of He from (n,α) reactions and the subsequent formation of voids in a neutron environment. Energetic 5 MeV $Fe^{++}$ and low current $He^{++}$ ions were directed at the steel samples at temperatures of 440, 460, and 480° C. to an irradiation dose level of 188 dpa. ~2 MeV $He^{++}$ ions are transmitted through an Al foil with a thickness of ~3 μm in order to degrade their energy and deposit the $He^+$ at the appropriate depth in the steel. The precise $He^{++}$ beam energy is dependent on the exact thickness of the Al foil. The Al foil is rotated relative to the $He^{++}$ beam in order change the incidence angle of the beam and modify the depth of implantation in the steel to range from 300-1000 nm. The incidence angle varies from 0-60° at five different intervals, with different hold times for each incidence angle, producing five separate depth profiles that cumulatively provide a roughly uniform (±10%) He concentration from 300-1000 nm into the steel.

The irradiations were conducted on the three heats and the historical control sample using a 3 MV Pelletron accelerator. Samples were irradiated using a combination of a defocused 5 MeV $Fe^{++}$ ion beam with typical beam current of ~100-

400 nA on the samples and a 3 mm diameter focused ~2 MeV He$^{++}$ beam that was raster scanned at 0.255 kHz in x and 1.055 kHz in y. Before each irradiation, the stage was outgassed to a pressure below 1×10$^{-7}$ torr. The beam current was recorded every 30-60 minutes using the Faraday cup immediately in front of the samples and the integrated charge (current×time) was converted to dose based on the damage rate output of Stopping Range of Ions in Matter (SRIM) calculation at a depth of 600 nm using the Quick Kinchin-Pease mode and a 40 eV displacement energy.

The samples were mechanically polished using SiC paper up to a fine grit of #4000 followed by final polishing with diamond solutions up to 0.25 µm, with a final mechanical polishing of 0.02 colloidal silica solution prior to irradiation. After mechanical polishing, specimens were electropolished for 20 seconds in a 90% methanol and 10% perchloric acid solution, at temperatures between −40° C. and −50° C., with an applied potential of 35 V between the specimen and platinum mesh cathode.

Temperature control was achieved by using a series of thermocouples affixed to irradiation samples that are heated and then used to calibrate a two-dimensional imaging pyrometer at the irradiation temperature. Temperature was controlled using the imaging pyrometer to ±10° C. throughout the irradiation.

Irradiated sample preparation was accomplished using cross-section focused ion beam (FIB) liftouts from the irradiated surface of each sample. The liftout method allows the entire irradiation damage region to be imaged, and for void imaging analysis to be consistently performed only at the desired depth.

Figure 7:
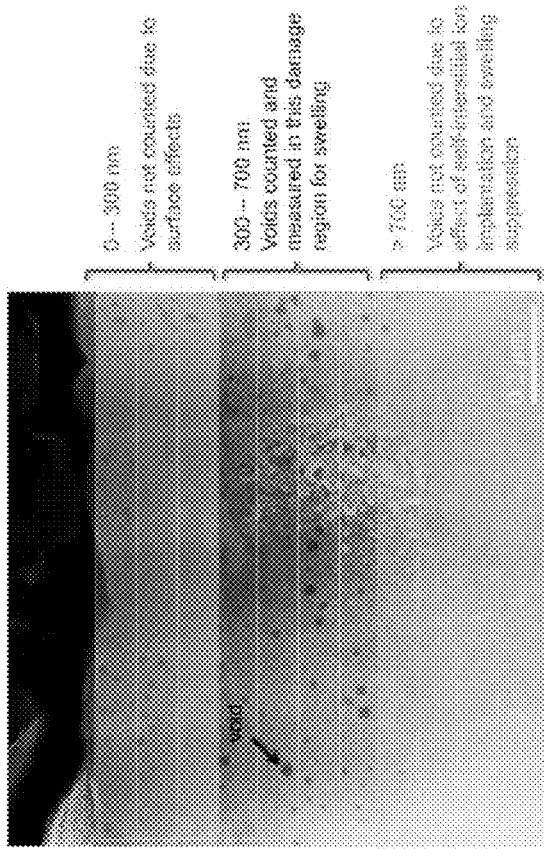
FIG. 7 illustrates a representative transmission electron microscope (TEM) image illustrating the depth effect on voids created by irradiation.

FIG. 7 illustrates a representative transmission electron microscope (TEM) image illustrating the depth effect on voids created by irradiation. Void imaging was done on a JEOL 2100F TEM. Void measurements included only voids that were within a damage zone depth of 300-700 nm into the sample, as represented by FIG. 7. By performing the analysis in this way, all voids at the surface (0-300 nm), which would be influenced by surface effects and changes in surface composition, were not taken into account. So, too, all voids at the end of damage curve (>700 nm) that may be affected by self-interstitial implantation of the Fe$^{++}$ ion were not considered. Self-interstitial ions at the end of the damage curve tend to suppress void nucleation by affecting the vacancy/interstitial bias that causes void nucleation.

Sample thickness was measured using electron energy loss spectroscopy (EELS) to measure the zero energy loss fraction and determine sample thickness. Using sample thickness and image area, void density and swelling measurements can be made.

As mentioned above, the irradiations included a sample from the archived ACO-3 duct HT9 material from FFTF for a relative swelling comparison to the composition embodiments described above. Heavy ion irradiations were conducted on the four heats (CH, DH, FD, and ACO-3) described above in order to generate a relative comparison in swelling behavior among the different heats. The swelling response could also be compared to the archive (heat 84425) of HT9 from ACO-3 duct wall from the FFTF program, irradiated at 443° C. to a dose of 155 dpa, which demonstrated swelling of ~0.3% based on TEM imaging of the voids. Information regarding the historic heat of HT9 from FFTF program can be found in the article Phase Stability of an HT-9 Duct Irradiate in FFTF, by O. Anderoglu, et al., Journal of Nuclear Materials 430 (2012) pp. 194-204.

Figure 8:
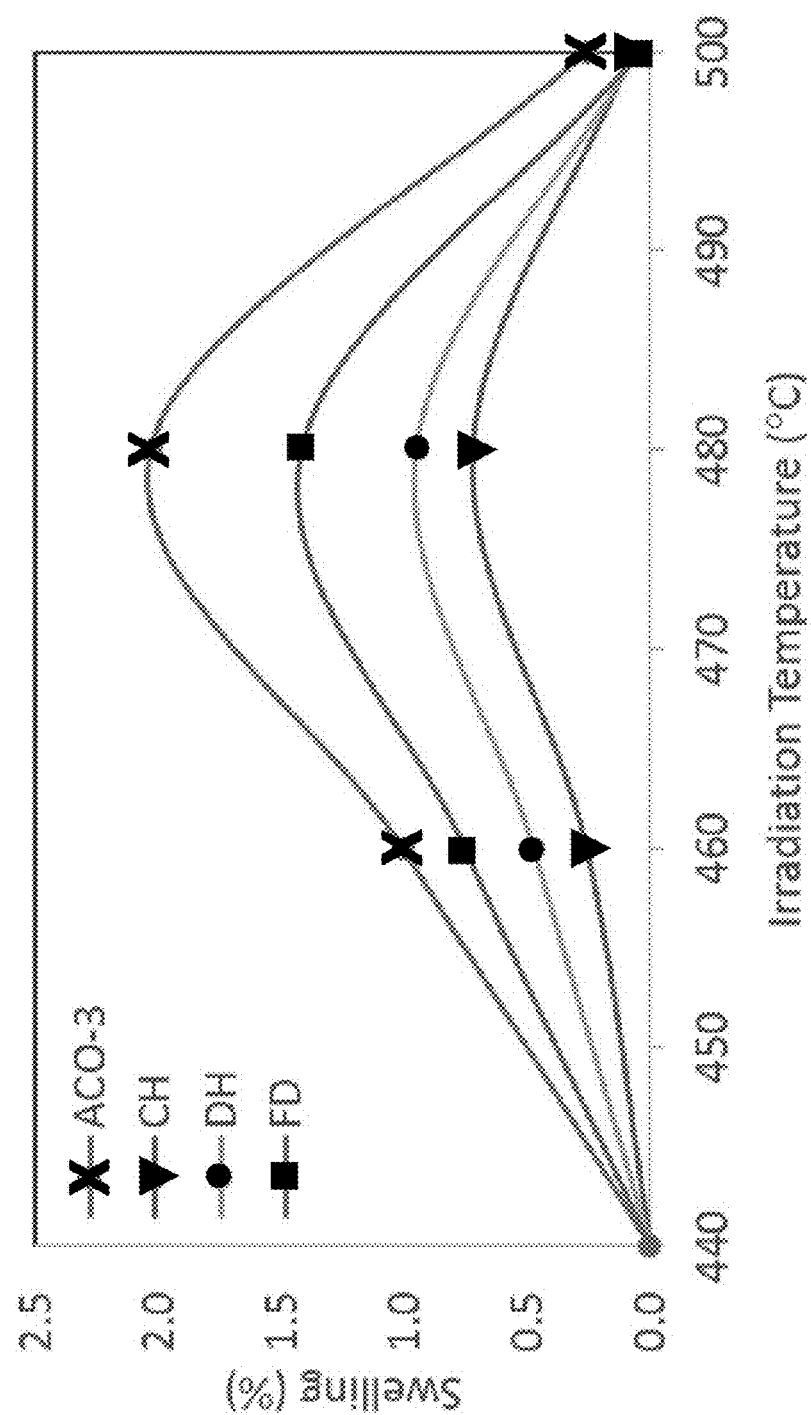
FIG. 8 shows the swelling results for the heats illustrating the difference in void swelling performance of the composition embodiments relative to the archived ACO-3.

To quantify the difference in swelling performance between the embodiments of the present compositions and the historic ACO-3 steel, the swelling % data in FIG. 8 were determined using process identified in Section 2.2 of the article Void Swelling And Microstructure Evolution At Very High Damage Level In Self-Ion Irradiated Ferritic-Martensitic Steels, by E. Getto, et al., Journal of Nuclear Materials 480 (2016) pp. 159-176, which section is incorporated herein by reference. Wherever swelling % is used in this disclosure, it is calculated by the process identified in the incorporated Section.

FIG. 8 shows the swelling results for the heats. FIG. 8 clearly shows the difference in void swelling performance of the composition embodiments relative to the archived ACO-3. At the lower and higher temperatures, 440° C. and 500° C., little swelling was detectable in any of the heats. However, at temperatures of 460° C. and 480° C., each of the three heats of the present composition show significant improvements in swelling over the historic ACO-3 steel.

Figure 9:
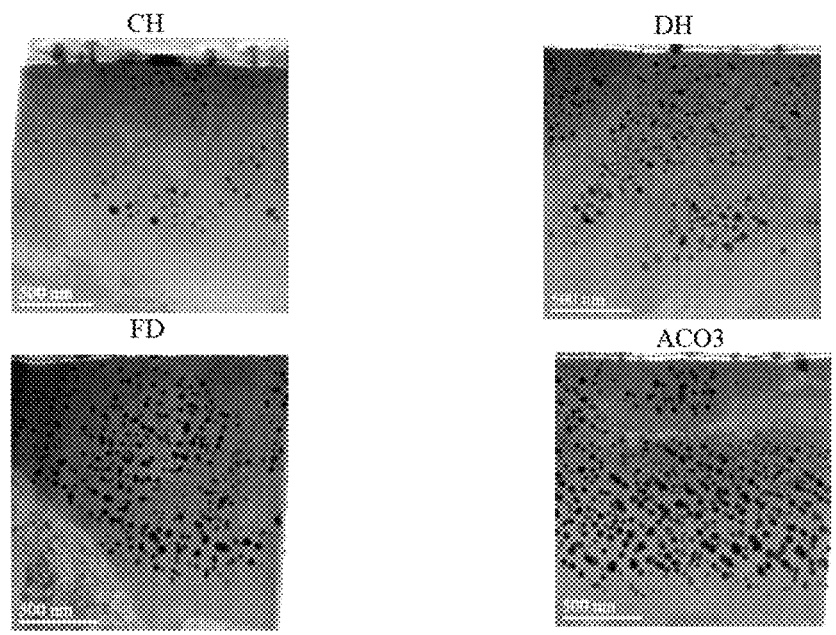
FIG. 9 shows a TEM collage of void microstructure in the four heats after irradiation at 480° C. to 188 dpa with 0.2 appm He/dpa, in which the voids appear as the black pockets.

FIG. 9 shows a TEM collage of void microstructure in the four heats after irradiation at 480° C. to 188 dpa with 0.2 appm He/dpa, in which the voids appear as the black features. The ACO-3 sample showed an inhomogeneous distribution of voids, but with a large cluster of many voids. The heats of the present composition each show a clear improvement over the ACO-3. The differences between ACO-3 and the heats of the present composition are striking and reflect a difference in void incubation between ACO-3 and the embodiments of the steel compositions described herein.

Figure 10:
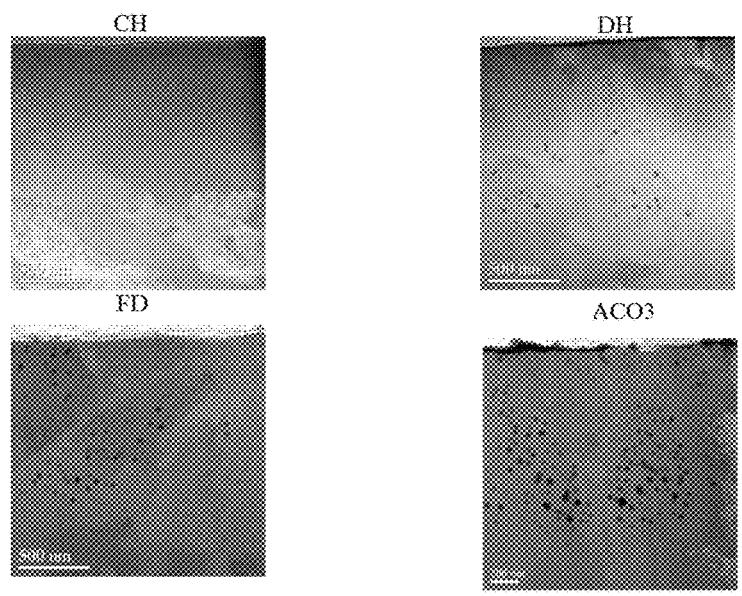
FIG. 10 shows a TEM collage of void microstructure in the four heats after irradiation at 460° C. to 188 dpa with 0.015 appm He/dpa.

FIG. 10 shows a TEM collage of void microstructure in the four heats after irradiation at 460° C. to 188 dpa with 0.015 appm He/dpa. Again, the heats of the present composition each show a clear improvement over the ACO-3.

The examples provided above show that a steel of the composition:

Cr at between about 10.0 wt % and about 13.0 wt %;
C at between about 0.17 wt % and about 0.23 wt %;
Mo at between about 0.80 wt % and about 1.2 wt %;
Si less than or equal to about 0.5 wt %;
Mn less than or equal to about 1.0 wt %;
V at between about 0.25 wt % and about 0.35 wt %;
W at between about 0.40 wt % and about 0.60 wt %; and
Fe at least 80 wt %;

can be manufactured that exhibits a swelling of less than 0.9% by volume, and in some cases less than 0.75%, less than 0.5%, and even less than 0.3% at a depth between 500-700 nm below the surface after dual-beam Fe$^{++}$ and He$^{++}$ irradiation to doses of 188 displacements per atom (dpa) with 0.2 appm He/dpa, as calculated using the Stopping Range in Matter simulation with the K-P option for damage cascades and a 40 eV displacement energy, created by irradiating the steel composition at 460° C. with a defocused beam of 5 MeV Fe$^{++}$ ions and a raster-scanned beam of ~2 MeV He$^{++}$ ions transmitted through a thin Al foil for scattering and energy reduction to create a uniform He profile at the irradiation depth of the sample.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include, but are not limited to, physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Any portion of the processes described herein may be automated. The automation may be accomplished by involving at least one computer. The automation may be executed by program that is stored in at least one non-transitory computer readable medium. The medium may be, for example, a CD, DVD, USB, hard drive, etc. The selection and/or design of the fuel element structure, including the assembly, may also be optimized by using the computer and/or a software program.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

Also, the technology described herein may be embodied as a method, of which at least one example has been provided. The acts performed as part of the method may be ordered in any suitable way. Accordingly, embodiments may be constructed in which acts are performed in any order different from that illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "including" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of," "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

In the claims, as well as in the specification above, all transitional phrases such as "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A steel composition comprising:
   Cr at between about 10.0 wt % and about 13.0 wt %;
   C at between about 0.17 wt % and about 0.23 wt %;
   Mo at between about 0.80 wt % and about 1.2 wt %;
   Si less than or equal to about 0.5 wt %;
   Mn less than or equal to about 1.0 wt %;
   V at between about 0.25 wt % and about 0.35 wt %;
   W at between about 0.40 wt % and about 0.60 wt %; and
   Fe at least 80 wt %;
   wherein the steel composition has been processed so that it exhibits a swelling of less than 0.9% by volume at a depth between 500-700 nm below the surface after dual-beam Fe++ and He++ irradiation to doses of 188 displacements per atom (dpa) with 0.2 appm He/dpa, as calculated using the Stopping Range in Matter simulation with the K-P option for damage cascades and a 40 eV displacement energy, created by irradiating the steel composition at 460° C. with a defocused beam of 5 MeV Fe++ ions and a raster-scanned beam of ~2 MeV He++ ions transmitted through a thin Al foil for scattering and energy reduction to create a uniform He profile at the irradiation depth of a sample of the steel composition;
   wherein the processing of the steel composition includes transforming at least some of the steel composition into an austenite phase by heating the steel composition to a temperature from 1100° C. to 1300° C. for 40-60 hours.

2. The steel composition of claim 1, wherein the steel composition exhibits a swelling of less than 0.75% by volume.

3. The steel composition of claim 1, wherein the steel composition exhibits a swelling of less than 0.5% by volume.

4. The steel composition of claim 1, wherein the steel composition exhibits a swelling of less than 0.3% by volume.

5. The steel composition of claim 1, wherein the steel composition is an HT9 steel.

6. A fuel element made of the steel composition of claim 1.

7. A component of a fuel assembly made of the steel composition of claim 1.

8. A steel composition comprising:

$(Fe)_a(Cr)_b(Mo, Ni, Mn, W, V)_c N_d$;

wherein a, b, c, and d are each a number greater than zero representing a weight percentage;

b is between 11 and 13;

c is between about 0.25 and about 0.9;

d is between about 0.01 and about 0.04; and balanced by a; and wherein the steel composition has been processed so that it exhibits a swelling of less than 0.9% by volume at a depth between 500-700 nm below the surface after dual-beam Fe++ and He++ irradiation to doses of 188 displacements per atom (dpa) with 0.2 appm He/dpa, as calculated using the Stopping Range in Matter simulation with the K-P option for damage cascades and a 40 eV displacement energy, created by irradiating the steel composition at 460° C. with a defocused beam of 5 MeV Fe++ ions and a raster-scanned beam of ~2 MeV He++ ions transmitted through a thin Al foil for scattering and energy reduction to create a uniform He profile at the irradiation depth of a sample of the steel composition;

wherein the processing of the steel composition includes transforming at least some of the steel composition into an austenite phase by heating the steel composition to a temperature from 1100° C. to 1300° C. for 40-60 hours.

9. The steel composition of claim 8, wherein b is between 11.5 and 12.5.

10. The steel composition of claim 8, wherein the steel composition exhibits a swelling of less than 0.75% by volume.

11. The steel composition of claim 8, wherein the steel composition exhibits a swelling of less than 0.5% by volume.

12. The steel composition of claim 8, wherein the steel composition exhibits a swelling of less than 0.3% by volume.

13. The steel composition of claim 8, wherein the steel composition is an HT9 steel.

14. A fuel element made of the steel composition of claim 8.

15. A component of a fuel assembly made of the steel composition of claim 8.

* * * * *